F. W. KROGH, DEC'D.
C. A. KROGH AND O. POULSEN, ADMINISTRATORS.
CENTRIFUGAL PUMP.
APPLICATION FILED DEC. 22, 1919.
1,342,552. Patented June 8, 1920.
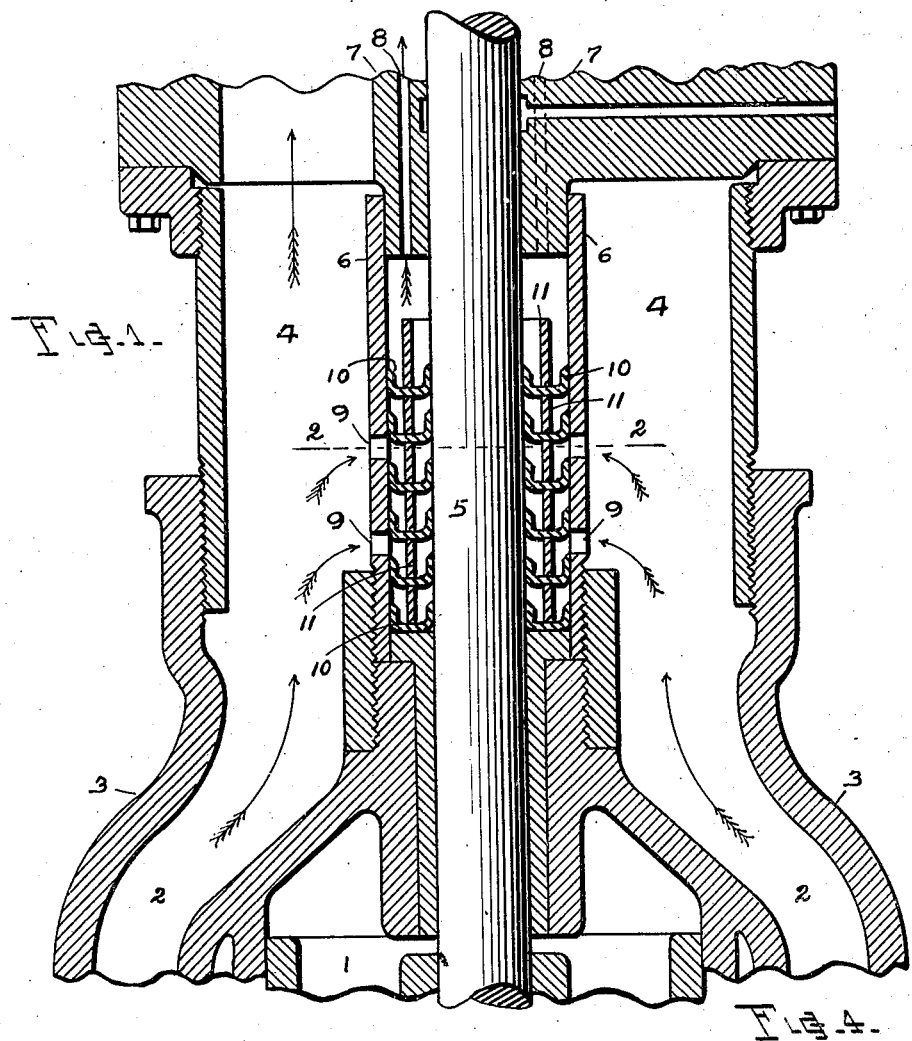
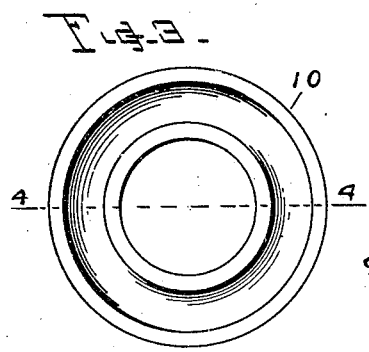
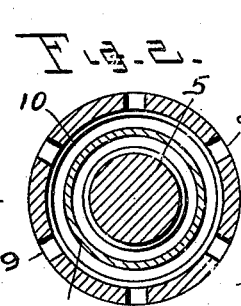
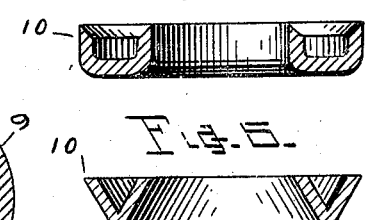

UNITED STATES PATENT OFFICE.

FERDINAND W. KROGH, DECEASED, LATE OF SAN FRANCISCO, CALIFORNIA, BY CARL A. KROGH, OF SAN FRANCISCO, AND OSCAR POULSEN, OF ALAMEDA, CALIFORNIA, ADMINISTRATORS.

CENTRIFUGAL PUMP.

1,342,552.      Specification of Letters Patent.      Patented June 8, 1920.

Application filed December 22, 1919. Serial No. 346,659.

*To all whom it may concern:*

Be it known that we, CARL A. KROGH and OSCAR POULSEN, both citizens of the United States, and residing, respectively, in the city and county of San Francisco, and Alameda, county of Alameda, in the State of California, administrators of the estate of FERDINAND W. KROGH, late a citizen of the United States, deceased, who did invent certain new and useful Improvements in Centrifugal Pumps, whereof the following is a specification.

This invention relates to shafts for pumps, more especially centrifugal pumps of the deep well type.

The object of the invention is to prevent waste oil from the shaft bearings from getting into the pumped water, and contaminating it.

In deep well centrifugal pumps especially, there are necessarily a number of bearings in the length of the shaft. To prevent the waste oil from these bearings from getting into the pumped water, the shaft is surrounded with an oil discharge tube, which receives the waste oil from the bearings. The lower end of this tube is perforated so that water from the pump discharge may enter the tube, and a series of valves are applied, through which said water must pass in its path into the tube, which valves prevent the waste oil from getting out through the perforations, while permitting the water to enter therethrough. The precise structure, which is preferable, will be described hereinafter.

The invention is illustrated as applied to a centrifugal pump, in the accompanying one sheet of drawing, in which:—

Figure 1 is a sectional elevation, showing a part of the impeller, and of its casing, and a part of the discharge pipe of the pump, and of the oil tube, in section, and a length of the shaft in elevation, and the valves and a bearing about the same, in section.

Fig. 2 is a cross section taken on the line 2, 2, of Fig. 1 showing particularly the perforations through the oil tube.

Fig. 3 is a top view of one of the valves.

Fig. 4 is a section through one of the valves, taken on the line 4, 4, of Fig. 3.

Fig. 5 is a section of a valve showing the sectional shape of the same slightly modified.

Referring to these figures: The pump impeller 1, of which only the upper part is shown, discharges water from the well through the discharge 2 of the casing 3, into the discharge pipe 4. The pump shaft 5, which gives rotation to the impeller, extends upward in the discharge pipe 4, and is surrounded by an oil tube 6, which separates the shaft, and its bearings (only one of which is shown), from the water in the pipe 4. Thus oil, which works through the bearings 7 of the shaft, commonly called "waste oil", enters the tube 6, and is retained thereby. To get this oil out of the tube, water is admitted thereto, from the discharge of the pump, which water forces the oil upward through the channels 8 in the bearings 7 and out at the upper part of the tube. The water for this purpose is admitted to the tube through a series of perforations, as 9, in the lower part thereof. To permit the water to pass upward into the tube, and to prevent the oil from passing downward, a series of valves 10, is applied between the shaft and the tube. These valves may be conveniently made of annular form, and U shaped cross-section, and may be stamped from leather or some equivalent material. Seated in the concave of each valve a ring of stiff material is placed, such as metal, as at 11. This metal ring serves as a support for the next adjacent valve, whose convex may rest thereupon. The cross-sectional shape of the valves may vary from the U form, as seen, for example, in Fig. 5.

Having thus described the invention, and an embodiment of it, in the full, clear and exact terms required by law, the same is not to be limited to the precise construction and arrangement of the several parts, as herein set forth, as the same may be variously modified by a skilled mechanic without departing from the spirit of the invention.

What is claimed and desired to be secured by Letters Patent of the United States, is the following, to wit:—

1. In a pump, in combination, a water impeller, a discharge for the pumped water, a shaft and bearings for driving the impeller, a tube surroundng said shaft and adapted to receive waste oil from the bearings thereof, perforations for admitting water to said tube and one or more valves adapted to permit the passage of said water to the tube and prevent the exudation of oil therefrom.

2. In a pump, in combination, a water impeller, a discharge for the pumped water, a shaft and bearings for driving the impeller, a tube surrounding said shaft and adapted to receive waste oil from said bearing, perforations for admitting water to said tube, and one or more annular valves adapted to permit the passage of said water to the tube and prevent the exudation of oil therefrom.

3. In a pump, in combination, a water impeller and a water discharge therefrom, bearings and a shaft for driving said impeller, a tube surrounding said shaft and adapted to receive waste oil from said bearings, perforations for admitting water from said discharge to said tube, a series of annular valves surrounding said shaft within said tube and adapted to permit the passage of water into said tube and prevent the exudation of oil therefrom, said valves having an approximately U shaped cross-section, and a series of rings resting in the concave of said valves and supporting the convex of the next adjacent valve.

4. In a pump, in combination, with a shaft and its bearing, a perforated oil tube surrounding said shaft, check valves connected to said perforations and adapted to admit water in said tube and to prevent the exudation of oil therefrom.

5. In a pump, in combination, with a shaft and its bearing, a perforated tube surrounding said shaft, check valves connected to said perforations and adapted to admit water in said tube and to prevent the exudation of same therefrom.

In testimony whereof we have hereto signed our names in the presence of two witnesses this 16th day of Dec. 1919.

CARL A. KROGH,
OSCAR POULSEN,
*Administrators of the estate of Ferdinand W. Krogh, deceased.*

Witnesses:
FLORENCE L. WOLFE,
D. B. RICHARDS.